Aug. 23, 1966 K. HINRICHS ETAL 3,268,824
PULSE CODE MODULATION RECEPTION SYSTEM
Filed April 15, 1963 10 Sheets-Sheet 1
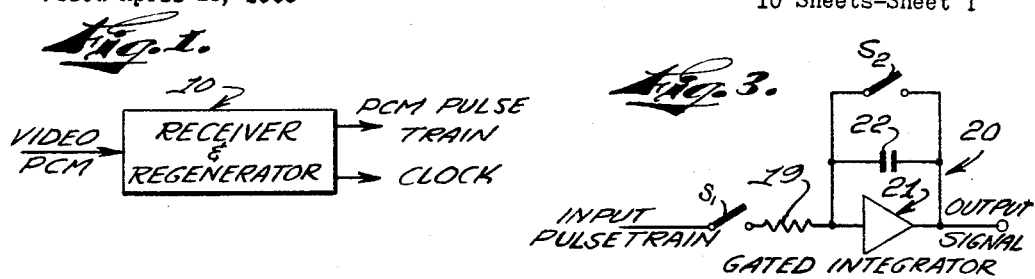
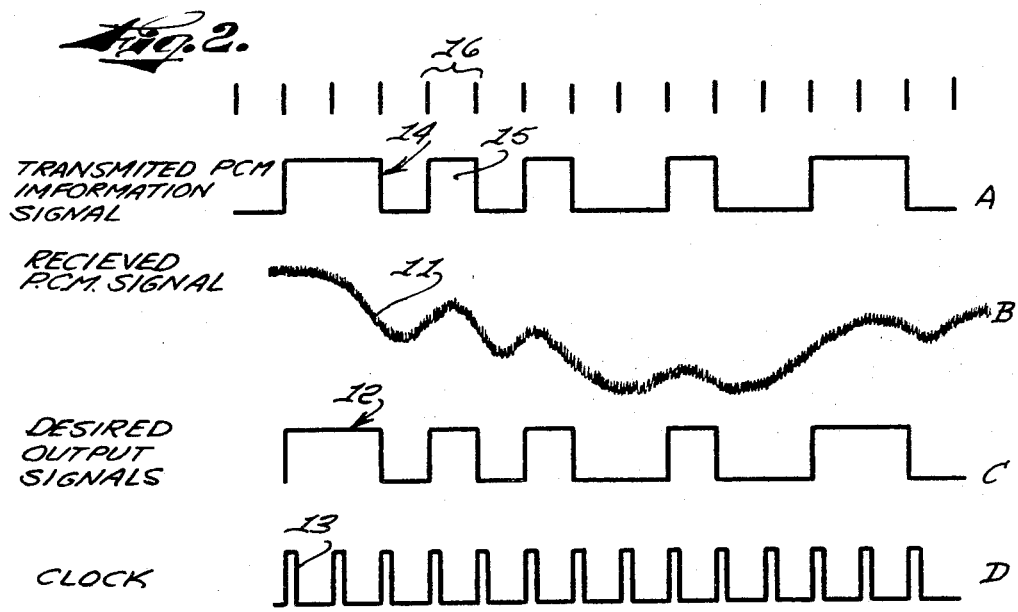
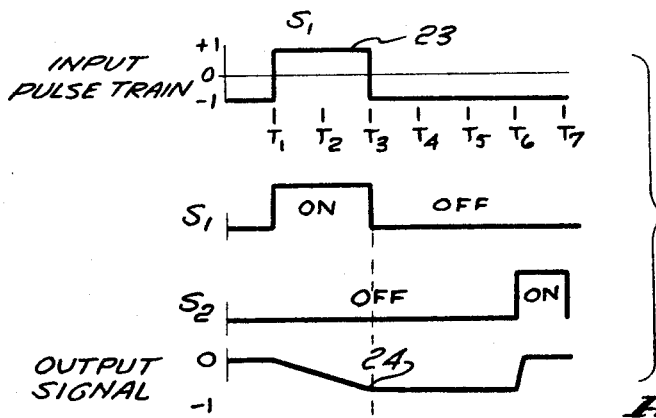
INVENTORS
HARRY G. BERTUCCELLI
RICHARD A. DAVIS
KARL HINRICHS
JOHN R. KOLDEN
By FOWLER & KNOBBE
ATTORNEYS

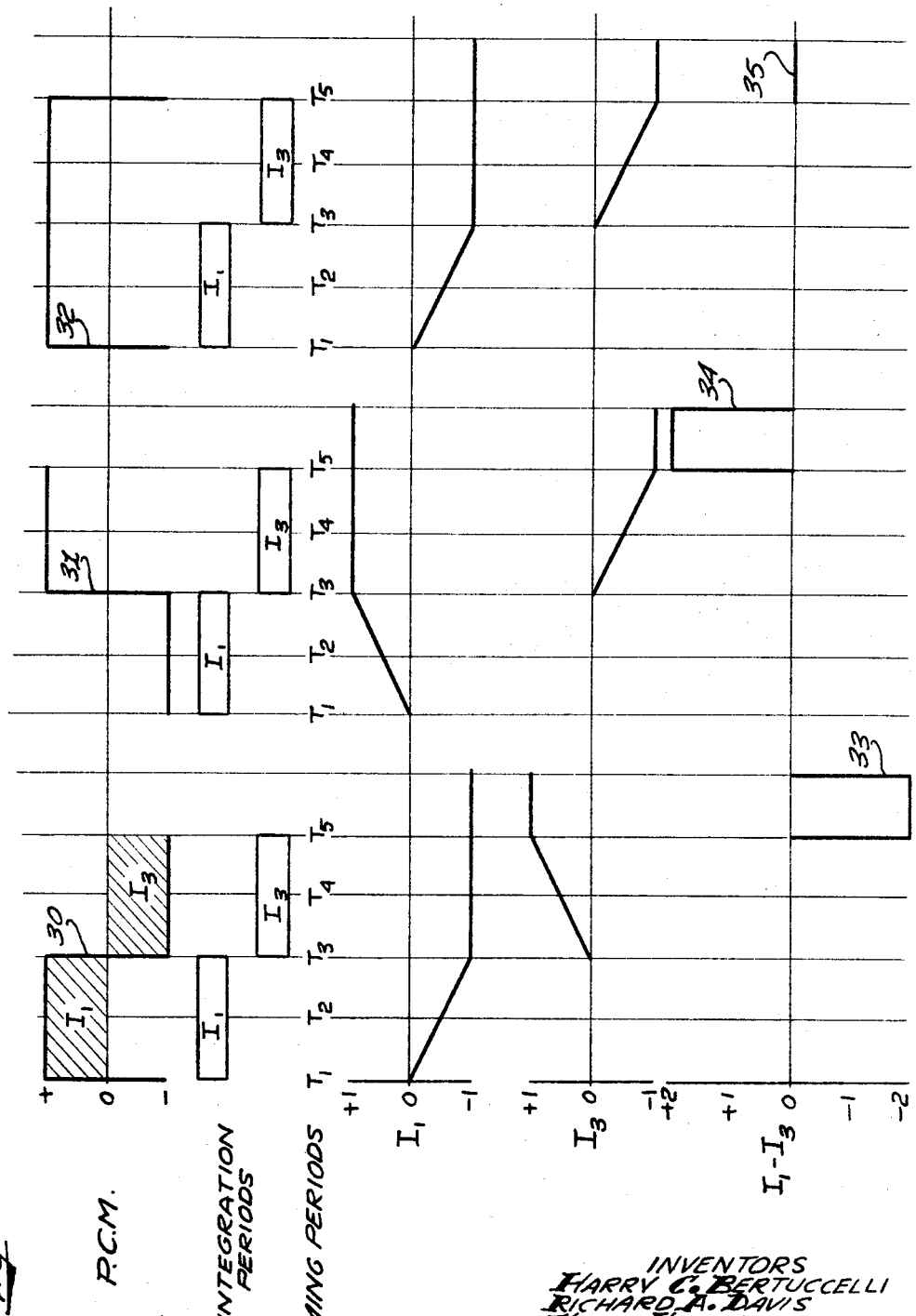

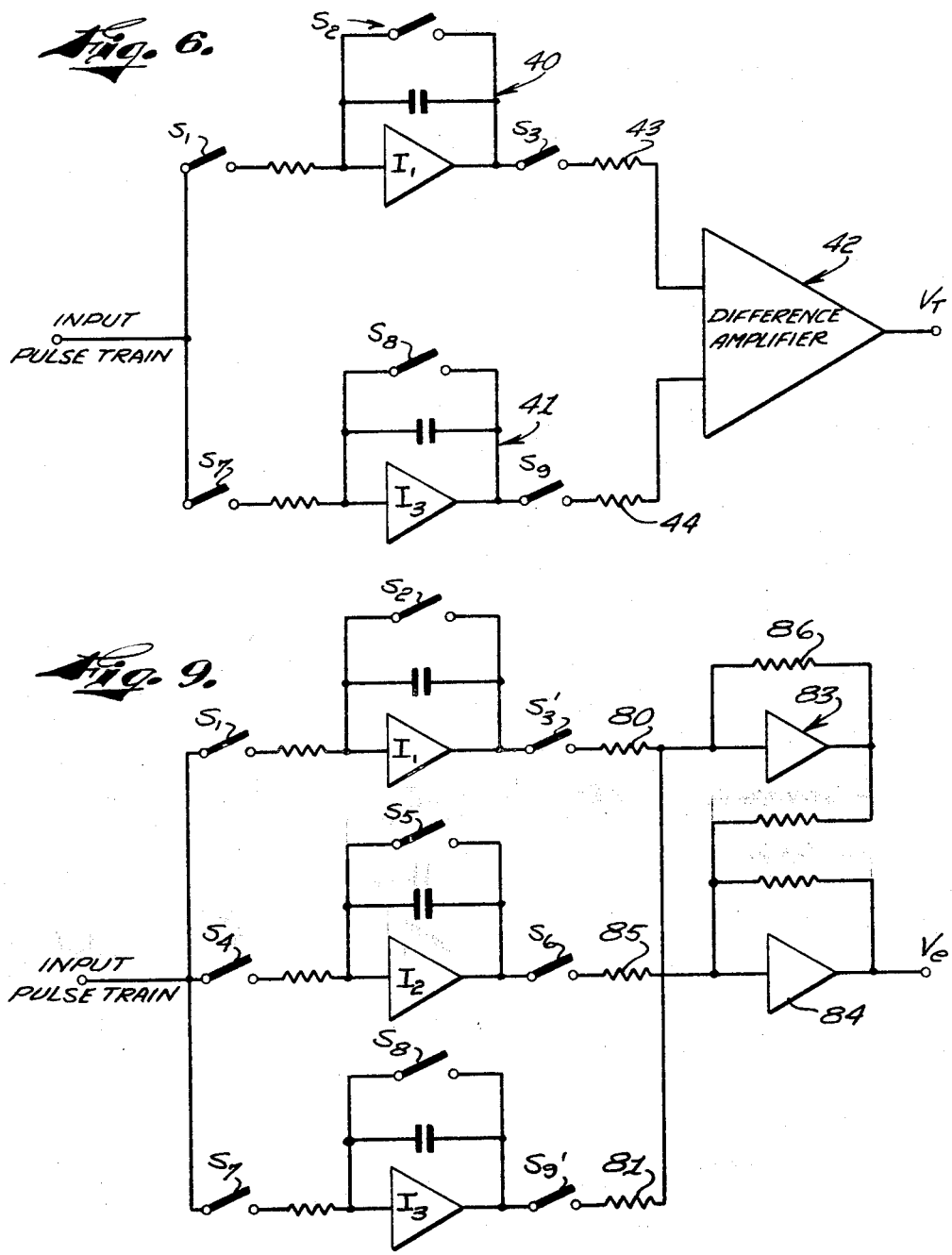

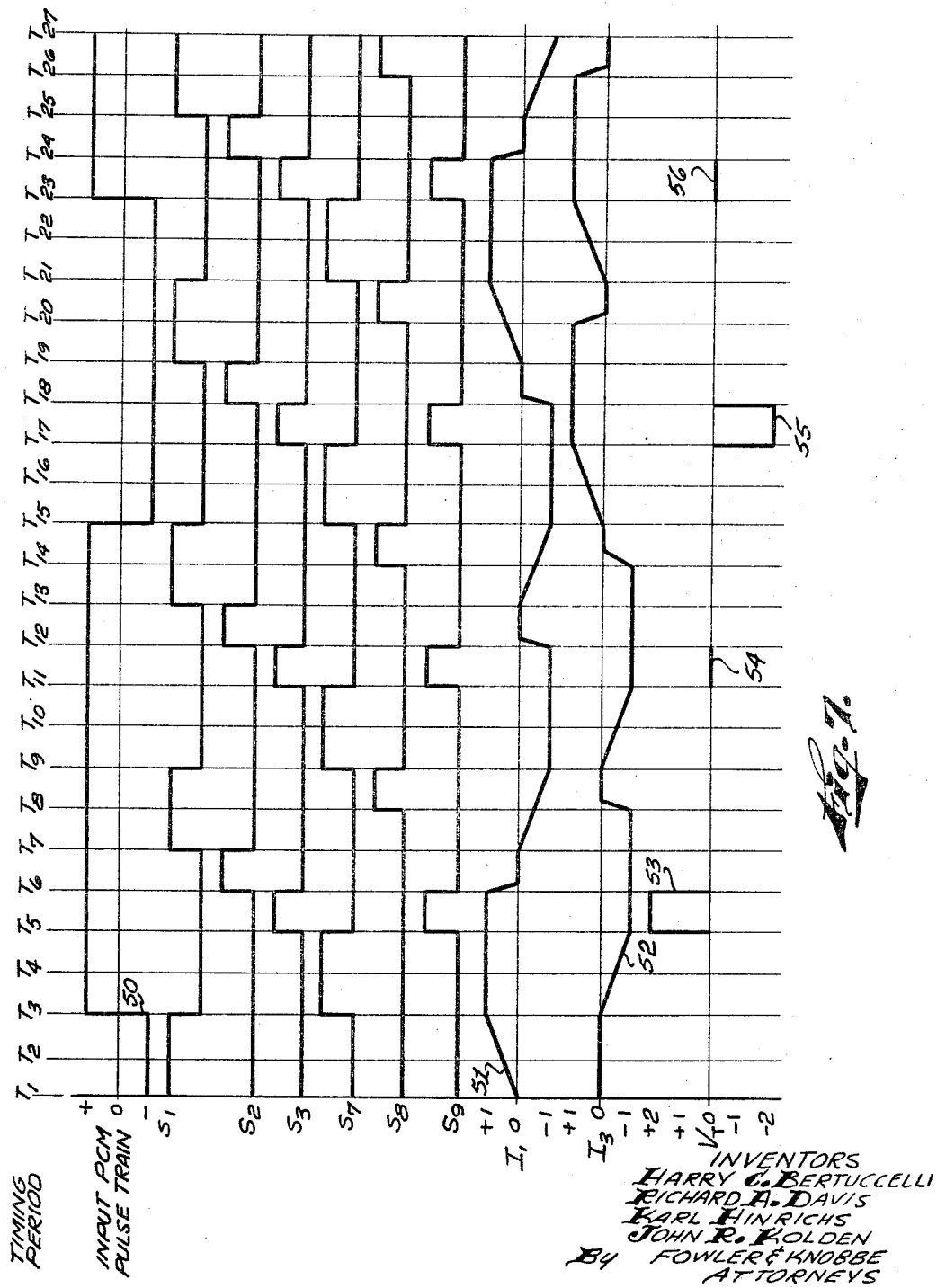

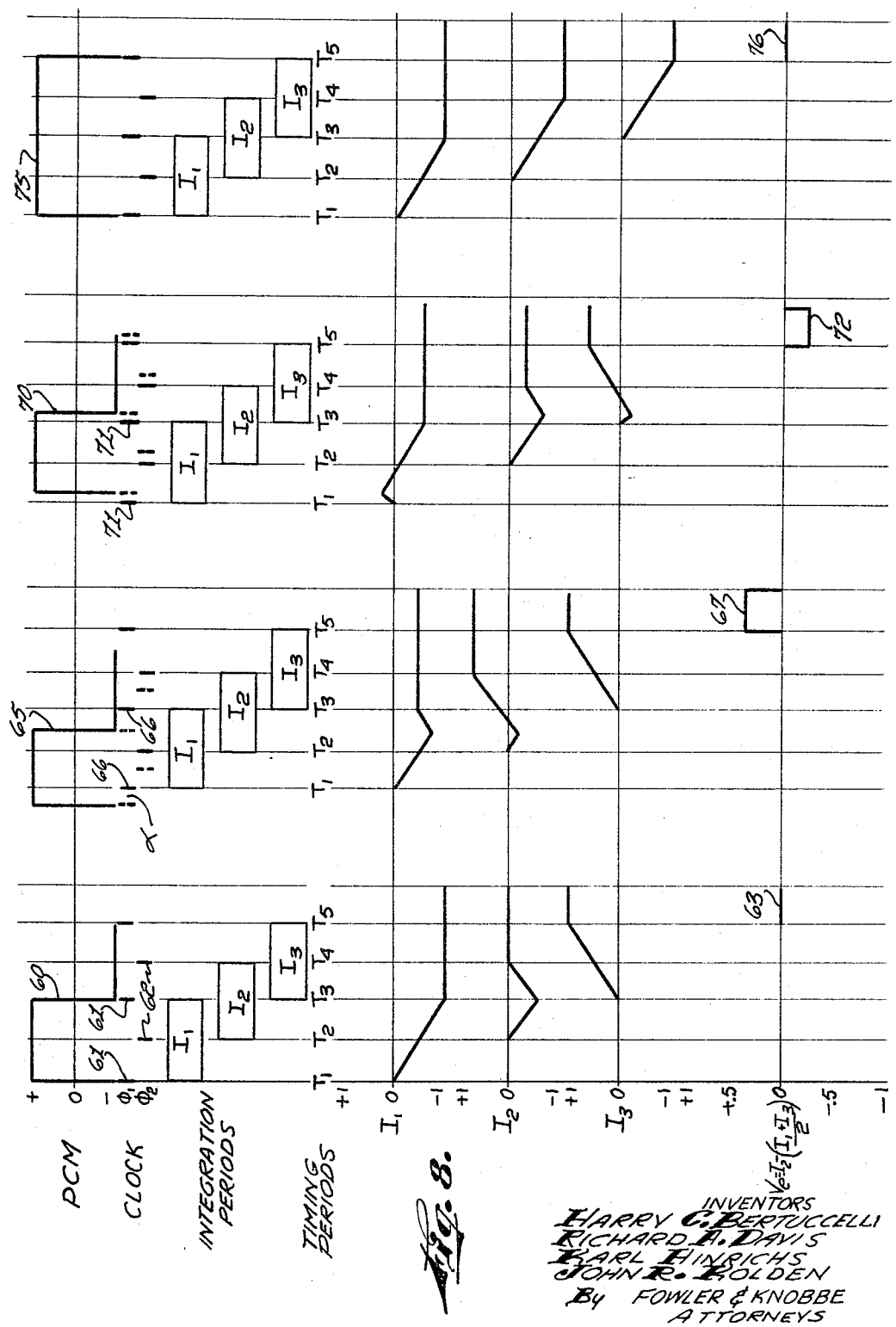

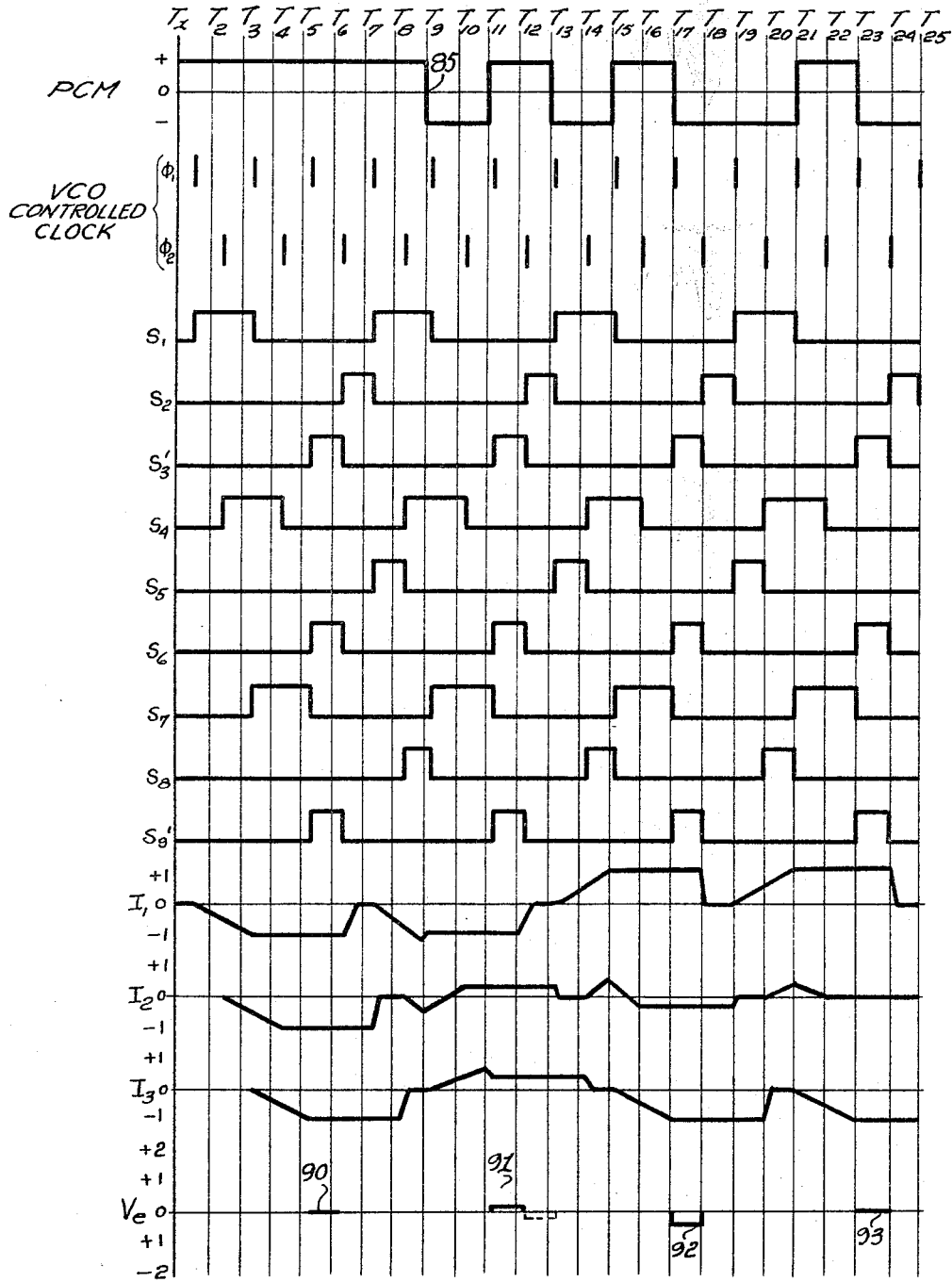

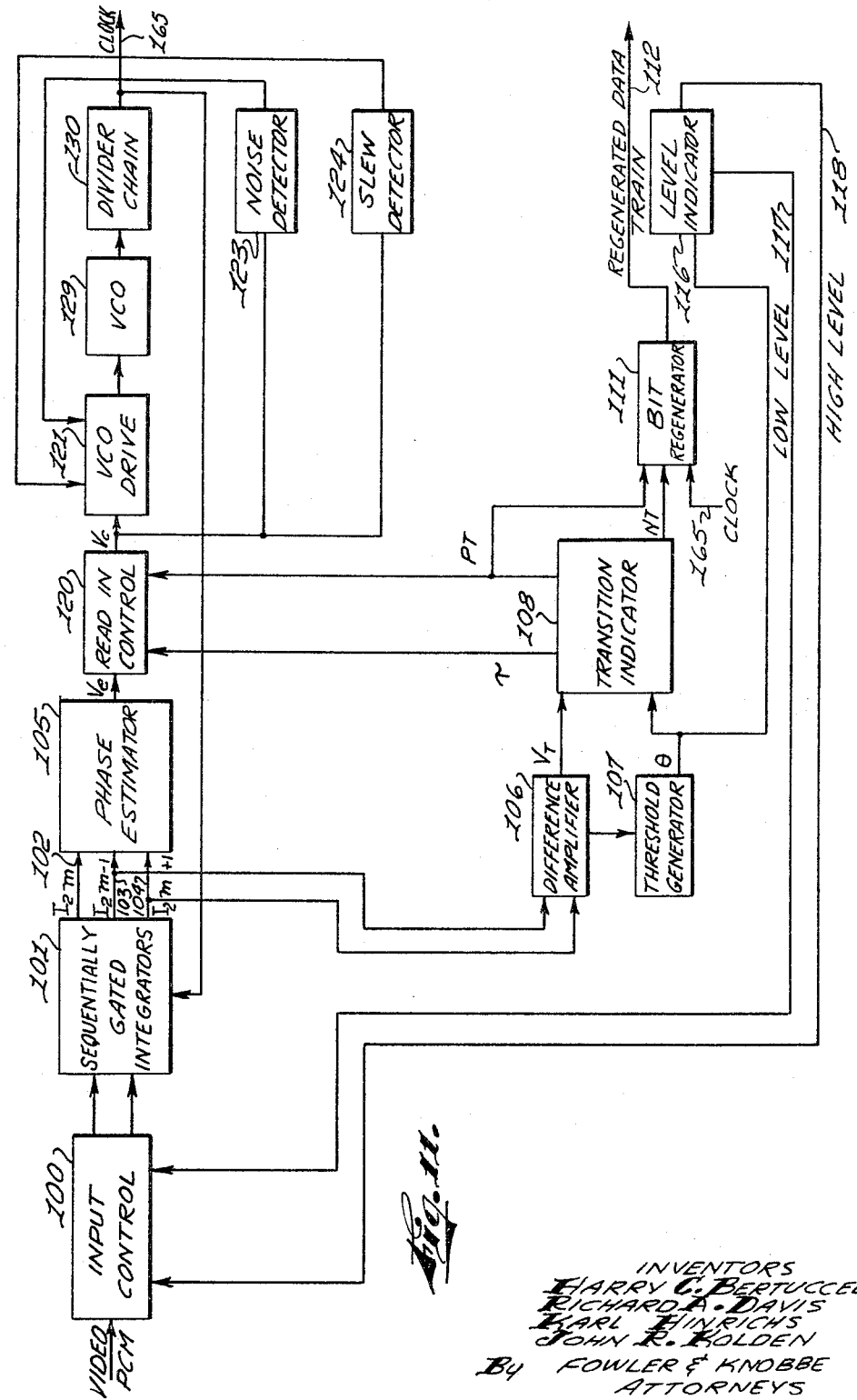

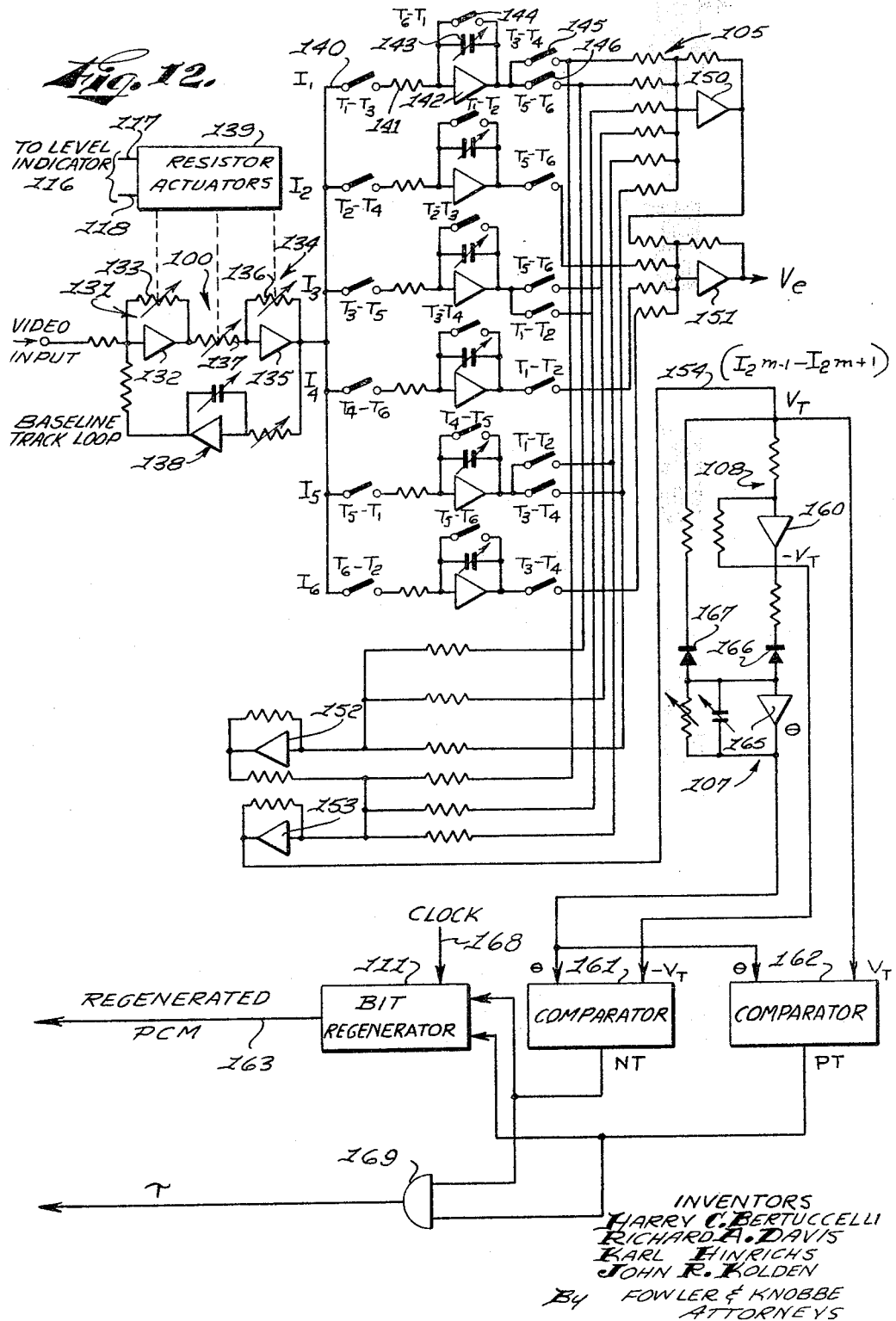

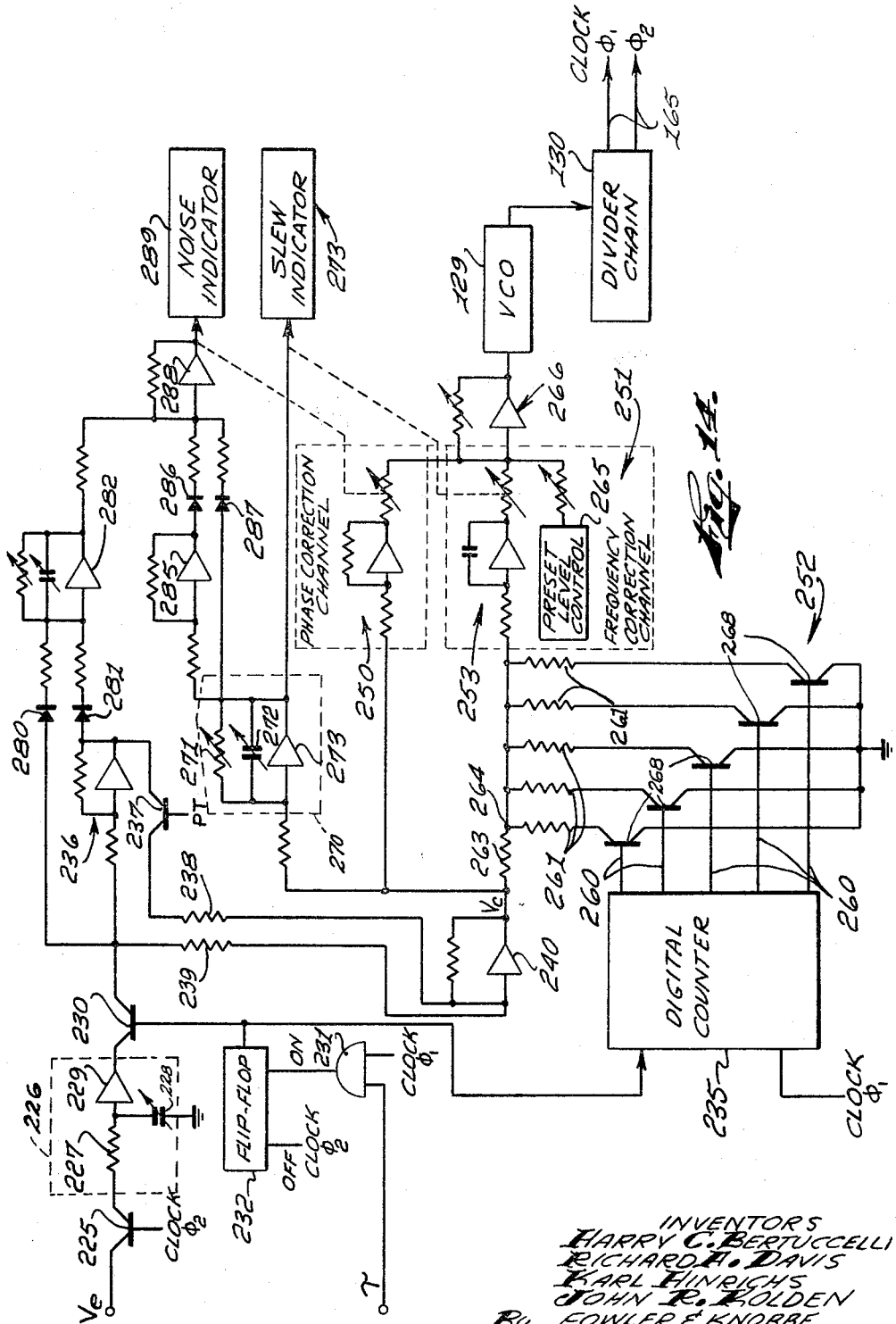

United States Patent Office 3,268,824
Patented August 23, 1966

3,268,824
PULSE CODE MODULATION RECEPTION SYSTEM
Karl Hinrichs, Fullerton, Richard Allen Davis, Brea, Harry Clifford Bertuccelli, Anaheim, and John Richard Kolden, Riverside, Calif., assignors to Beckman Instruments, Inc., a corporation of California
Filed Apr. 15, 1963, Ser. No. 273,007
32 Claims. (Cl. 328—165)

The present invention relates to a system for receiving a noisy pulse code modulated signal and regenerating therefrom an accurately reproduced pulse code modulated signal and synchronized clock signal.

The transmission of digital data by pulse code modulation (PCM) offers a number of advantages over other modulating systems. These advantages include quality and security of transmission, system flexibility, relative immunity to noise, and substantial economies resulting from the use of common equipment in multi-channel systems. The theory of PCM systems is well known, and reference is made to the following published technical papers:

(1) "Pulse Code Modulation," H. S. Black and J. O. Edson, Trans. AIEE, vol. 66, 1947, pp. 895–899.

(2) "Telephony by Pulse-Code Modulation," W. M. Goodall, Bell System Tech. Jnl., vol. 26, No. 3, July 1947, pp. 395–409.

(3) "The Philosophy of PCM," B. M. Oliver, J. R. Pierce, and C. E. Shannon, Proc. IRE, vol. 36, November 1948, pp. 1324–1331.

(4) "Pulse-Code Modulation," J. S. Mayo, Electro Technology, November 1962, pp. 87–98.

(5) "The Theory of Signal Detectability," W. W. Peterson, T. G. Birdsell, and W. C. Fox, IRE PGIT–4, 1954, pp. 171 ff.

(6) "PCM Signal-to-Noise Performance," J. H. Crow, Proc. Natl. Telemetry Conf., 1962, pp. 5–1 through 5–12.

From a technical standpoint, the concepts of PCM allow an almost unlimited trade-off of bandwidth versus data capacity and noise immunity. In practice, however, only a finite bandwidth is available which dictates a finite and often unfavorable signal-to-noise ratio. The performance of any given PCM system is thus heavily dependent upon the performance of the receiving and generation equipment.

The typical transmitted video PCM signal is subjected to high energy, low frequency noise components including wow, flutter, and drift, as well as white random noise. Certain techniques are presently known for compensating with varying degrees of success these detrimental noise effects upon the signal. Thus, a device known as the reset integrator offers optimum reception for wide band square wave PCM signals in the presence of white and random noise. See the papers by J. H. Peterson et al. and Dr. J. H. Crow noted above. However, the reset integrator is seriously affected by low frequency noise. Another apparatus known in the art employs peak detection circuits which follow the received wave form and attempt to introduce a compensation for low frequency noise. These circuits, however, are only moderately satisfactory since it is extremely difficult if not impossible to provide circuitry which will exactly follow the received wave form under all operating conditions. Thus, if the time constant is too short, the circuit will over compensate whereas if the time constant is too long, the signal may radically change its D.C. level before the sensing circuitry is able to detect the change. Still another apparatus known in the art is the filter-sampler. This device comprises either tunable filters or a multitude of plug-in filters corresponding to all possible bit rates. The filter-sampler provides optimum results for heavily filtered signals whose noise bandwidth is equal to the half bit rate (see the paper by Dr. J. H. Crow). A serious disadvantage of the filter-sampler is in providing wide band operation, since either tunable filters or a multitude of plug-in filters for all possible bit rates must be used. The former type of filter seriously comprises circuit performance and the latter filters are very expensive.

It is the object of the present invention to overcome the shortcomings of the existing methods of PCM detection. In particular, the present invention provides almost perfect cancellation of low frequency wow, flutter, noise and drift. The performance of the invention in the presence of wide band white noise approaches that of the signal reset integrator and far exceeds that of the filter-sampler. It is therefore extremely simple to provide for wide bandwidth operation with this invention.

Other and further objects, features and advantages of the invention will become apparent as the description proceeds.

Briefly, in accordance with a preferred form of the present invention, the noisy PCM video signal is admitted to a plurality of high-speed integrators. Each of these integrators is gated so as to have an integrating period roughly equal to the bit period which is followed by a hold period wherein the integration value is retained. After this integration value is read, the integrator is then reset so as to be in condition for performing a succeeding integration. The plurality of integrators are sequentially integrated so that each integrating period overlaps the preceeding and succeeding periods by 50%. It has been discovered that if the integrated value prior to a transition of the input signal is subtracted from the integrated value immediately following a transition, the difference between the integration values provides an accurate detection of a transition which is insensitive to high energy, low frequency noise components. Furthermore, it has been discovered that the local clock can be precisely controlled in phase and frequency by subtracting the integration value during a transition from the average of the integrated values immediately preceding and immediately following the transition. The resulting difference signal is used to control the local clock oscillator or generator until the transitions (when occuring) fall in the center of every other integration period.

The invention further includes means for determining the slew or change in frequency of the received signal, said information being used to vary the phase and frequency gains of the clock driver.

Another feature of the invention is the provision of means for generating a frequency control signal whose magnitude is inversely proportional to the number of bits between transitions in the received PCM sginal. This eliminates the overshoot common to normal phase-locked loops after long periods without transitions.

A more thorough understanding of the invention may be obtained by a study of the following detailed description taken in connection with the accompanying drawings in which:

FIG. 1 illustrates in simplified block diagram form the dual functions of PCM reception apparatus constructed in accordance with this invention;

FIGS. 2A, 2B, 2C and 2D illustrate a representative transmitted PCM signal, a representative received PCM signal and the desired output signals of the PCM reception equipment;

FIG. 3 is a simplified schematic of a gated integrator;

FIG. 4 illustrates the input and gating signals applied to the integrator of FIG. 3 and the resulting output signal;

FIG. 5 illustrates in diagrammatical form the operation of the transition detector of the present invention;

FIG. 6 is a simplified schematic diagram of the transition detector utilized in the present invention;

FIG. 7 is a graphic illustration of a representative input pulse train, the gating signals applied to the integrators of FIG. 6, the integration values obtained from the integrators of FIG. 6 and the transition detecting voltage $V_t$ generated by the circuit of FIG. 6;

FIG. 8 illustrates diagrammatically the generation of a control signal for controlling the local source of clock timing signals;

FIG. 9 is a simplified schematic of a plural integrator circuit for generating an output signal corresponding to the phase error of the local clock oscillator;

FIG. 10 is a graphical illustration of the input pulse train, the clock signals generated by the controlled clock, the gating signals applied to the integrators of FIG. 9 and their respective integration values, and the phase error signal $V_e$ generated by the circuit of FIG. 9;

FIG. 11 is a block diagram of a PCM reception system constructed in accordance with the present invention;

FIG. 12 is a more detailed schematic diagram of the input detector portion of the present invention;

Figure 13:
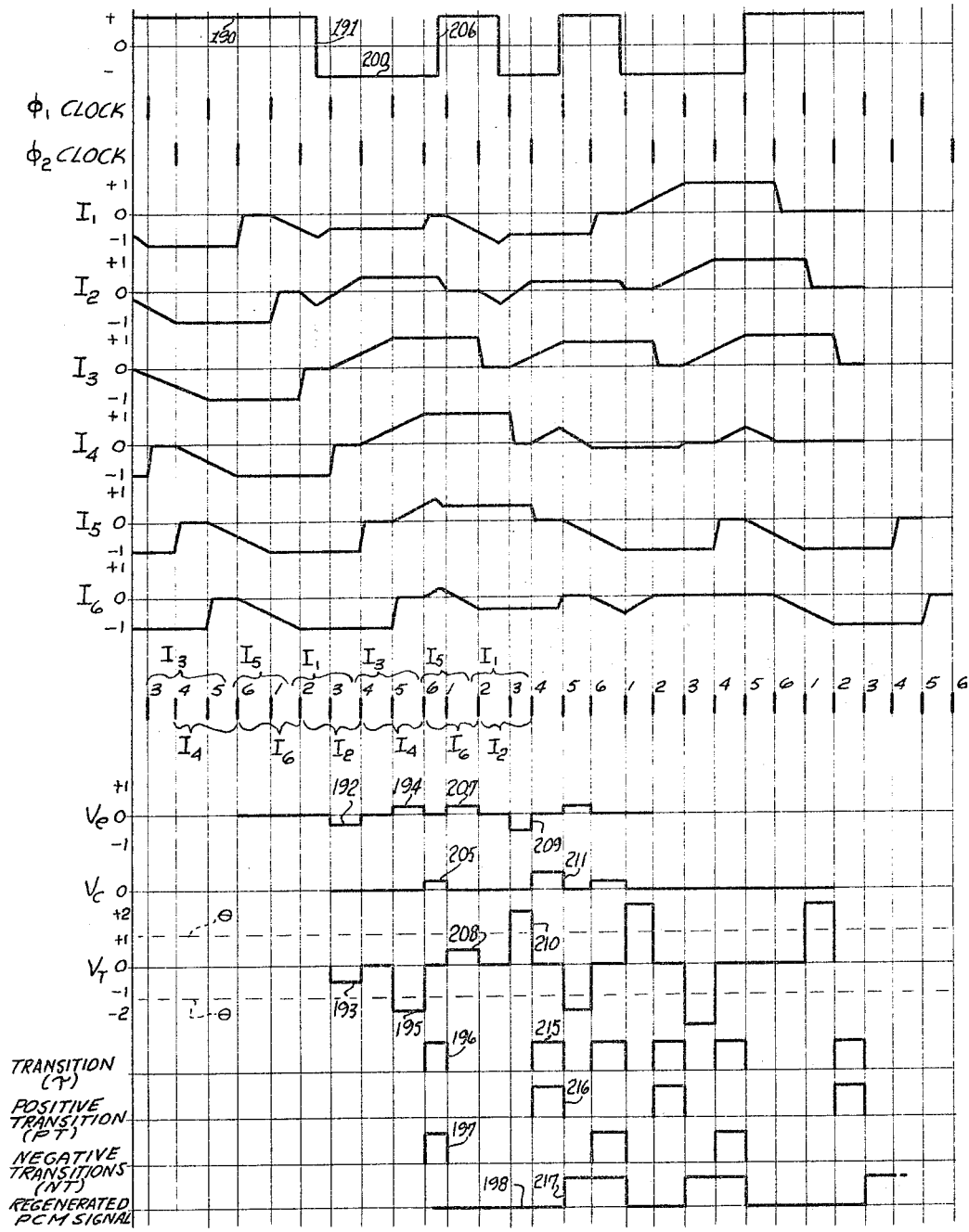

FIG. 13 is a graphical illustration of a representative input PCM signal supplied to the input detector of FIG. 12, the output signal generated by the control clock, the integrator values, the respective transistion and phase error signals $V_t$ and $V_e$, the phase control signal $V_c$, the transition signal $\tau$, the positive transition indicating signal PT, the negative transition indicating signal NT, and the regenerated PCM signal; and FIG. 14 is a more detailed schematic of the clock driving portion of the present invention and the noise and slew measuring circuits.

OVERALL FUNCTION OF INVENTION

Referring now to FIG. 1, the PCM reception apparatus shown comprises the receiver and regenerator 10 connected to receive the video PCM signal shown in FIG. 2 as signal 11. The outputs of receiver and regenerator 10 are two signals, one comprising a regenerated PCM serial pulse train and the other a synchronized clock signal. These signals are also illustrated in FIGS. 2C and 2D as the information PCM signal 12 and the clock signal 13, Referring now to FIG. 2A, a representative transmitted PCM information signal 14 comprises a plurality of square wave pulses whose presence or absence signifies a binary ONE or ZERO. The signal form shown is termed a non-return-to-zero (NRZ) pulse code modulation in which there is a one-to-one correspondence between the binary ONES and ZEROS and the PCM ONES and ZEROS. Another mode of pulse code modulation is that termed the return-to-zero (RZ) system wherein the binary ONE is represented by a PCM ONE for the first half of the bit period and a PCM ZERO for the last half of the bit period. A binary ZERO is a PCM ZERO for the entire bit period. An advantage of the NRZ coding over RZ coding is that in the former the fundamental bandwidth is only one-half the bit rate whereas in the latter the fundamental bandwidth is equal to the bit rate. Thus, in the NRZ signal shown, the pulse 15 represents a PCM ONE and occupies a period 16 of one bit length.

The invention may also be utilized for clock retiming and digital bit regeneration of PACM signals, that is, signals sent in sampled form where any given sample (usually on an a priori selected basis) may be either a digital bit or an analog sample.

When signal 14 is transmitted, it is affected, as shown in FIG. 2B, by varying amounts of noise including white noise and high energy components of low frequency noise. These latter components include low frequency wow, flutter, noise and drift. It is the function of the invention to regenerate a clean PCM signal 12 as an accurate reproduction of the transmitted PCM signal 14 and, in addition, a synchronized local clock signal 13.

GATED INTEGRATOR

The present invention utilizes a plurality of gated integrators of which one is shown in FIG. 3 by way of explanation. As shown, this gated integrator 20 includes an operational amplifier 21 having an integrating capacitor 22 connected between its input and output terminals. The input pulse train is connected to the amplifier input teminal via serial switch $S_1$ and input resistor 19. Capacitor 22 is selectively shunted by switch $S_2$. In the present invention, the integrator switches will normally be high speed semiconductor switches since PCM repetition rates of one million bits per second are not uncommon in contemporary telemetry systems.

In a typical operational mode of the gated integrator, the gating signal shown in FIG. 4 is applied to the respective switches $S_1$ and $S_2$. An ON signal signifies that a respective switch is closed, i.e. it is then conducting current between its input and output terminals whereas an OFF signal indicates that the switch is open. Initially, the gated integrator is connected in an integration mode wherein switch $S_1$ is ON for one bit period between the time markers $T_1$ and $T_3$. The input signal 23 is then connected to the input of the integrator which proceeds to integrate and generate the inverted output signal 24. A hold period follows the integrate period at time $T_3$ when the input signal is disconnected from the integrator and the integration value retained by the gated integrator circuit for one and a half bit period from $T_3$ to $T_6$. At any time during the hold period, the stored value of the integration may be read out to another part of the system in which it is employed. At time $T_6$ the integrator is reset by shunting capacitor 22 with switch $S_2$. The charge on the capacitor is thereupon reduced to zero and the integrator placed in condition for performing another integration at time $T_7$.

The present invention employs plural ones of such gated integrators for determining the transitions of the reproduced PCM signal and providing a control signal for synchronizing the frequency and phase of the local clock oscillator with the frequency and phase of the input PCM signal.

MODE OF OPERATION FOR TRANSITION DETECTION

FIG. 5 illustrates by appropriate waveforms the manner in which two integrators accurately determine the presence or absence of a transition in the received PCM signal, this detection being substantially independent of high energy, low frequency noise components appearing upon the received signal. Three representative PCM NRZ signals 30, 31, 32 are shown having a bit length which is two time markers long, e.g. $T_1$–$T_3$. Signal 30 includes a PCM ONE bit followed by a PCM ZERO bit. Signal 31 comprises a PCM ZERO bit followed by a PCM ONE bit and signal 32 comprises successive PCM ONE bits. For each signal, a first integrator $I_1$ integrates over the first bit period $T_1$–$T_3$ and subsequently holds the integration value and another integrator $I_3$ integrates the signal for the succeeding bit period $T_3$–$T_5$ and subsequently holds the integrated value. When both integrators are in their respective hold modes, their respective outputs are subtracted from each other to give the signal $I_1$–$I_3$ (corresponding to the difference between the shaded portions of signal 30, for example). The respective integrations and resultant difference values for each of the signals 30, 31, 32 are shown in the waveforms of FIG. 5. It will be noted that the output signal 33 generated for a PCM signal 30 is a negative polarity signal and is indicative of the negative going transition of signal 30. Contrariwise, the positive polarity output signal 34 indicates the positive going transition of PCM signal 31. When no transition is encountered between the respective integration periods, as in the case of PCM signal 32, the resultant difference signal 35 has a zero magnitude.

An important aspect of the invention is that the pulses 33 and 34 have a magnitude twice as large as the magnitude of the individual integrations $I_1$, $I_3$. This enables substantially positive detection of a transition by comparing the value of $I_1$–$I_3$ with the average peak-to-peak rectified value of the PCM waveform. No transition indication is given unless the value $I_1$–$I_3$ is greater than this average value. As described hereinafter, the threshold level corresponding to the average rectified peak-to-peak value of the input PCM signal may be automatically measured during signal reception so as to thereby minimize the introduction and deletion of information bits by noise.

Another significant feature of the transition detection illustrated in FIG. 5 is that the direct current component of the signal due to low frequency noise is cancelled out since each of the adjacent integrations performed by integrators $I_1$, $I_3$ will be effected by subsequently identical low frequency noise components. When these signal are subtracted from one another, that portion of the signal produced by the D.C. and low frequency noise is eliminated.

SIMPLIFIED TRANSITION DETECTOR

In FIG. 6 is illustrated a schematic of a simplified circuit for providing the integration and subtraction graphically illustrated in FIG. 5. As shown, each of the integrating circuits 40, 41 ($I_1$, $I_3$) are similar to the gated integrator circuit shown in FIG. 3 and described hereinabove. In addition, these inegrating circuits include an output switch such as switch $S_3$ of integrator 40 and switch $S_9$ of integrator 41 adapted to selectively connect the outputs of the respective integrators to the inputs of a difference amplifier 42 via resistors 43, 44. Difference amplifier 42 may be one of any number of circuits known in the art which provide an output signal proportional to the difference between the signals supplied its respective inputs.

Control signals for each of the respective switches of FIG. 6 for producing the requisite integrate, hold and reset values are illustrated in FIG. 7. By way of illustration, a representative integration sequence includes actuating switch $S_1$ of FIG. 6 at $T_1$. The integrator $I_1$ is thereupon caused to integrate the input PCM pulse train signal 50 over the time period $T_1$–$T_3$. The operation of this integrator upon the negative polarity PCM pulse produces the constantly increasing wave form 51 which begins at 0 volts and terminates at an assumed magnitude of +1. Switch $S_1$ is then deactuated and the charge on the capacitor of integrator $I_1$ is held for one and one-half bit periods ($T_3$–$T_6$). During a portion of this hold period, from $T_3$–$T_5$, inegrator $I_3$ is connected to the input pulse train by actuating switch $S_7$. The positive polarity PCM signal produces a constantly decreasing slope 52 which reaches the assumed quantity of −1 at time $T_5$ when switch $S_7$ is deactuated. Integrator $I_3$ is also retained in a hold period of one and one-half bits. Between time periods $T_5$–$T_6$, both integrators $I_1$ and $I_3$ are in hold condition at which time the output switches $S_3$ and $S_9$ are actuated to connect the respective integrators to the input of difference amplifier 42. An output signal 53 ($V_t$) is produced having a magnitude of +2 indicative of the positive going transition of the input PCM signal at time $T_3$.

Between time period $T_6$ and $T_7$, integrator $I_1$ is reset by actuating switch $S_2$ which shunts the integrator capacitor and causes the integration value to fall to zero. Immediately following the reset period, integrator $I_1$ repeats its cycle which is initiated by the actuation of switch $S_1$ during the bit period following between times $T_7$ and $T_9$. In a similar manner, integrator $I_3$ is caused to reset at time $T_8$ followed by a repetition of its integrate-hold-reset cycle. As a result, the output signals 54, 55 and 56 are generated, these signal respectively indicating the absence of a transition at time $T_9$, the negative going transition at time $T_{15}$, and the absence of a transition at time $T_{21}$ of the input PCM signal 50.

It will be understood that FIGS. 6 and 7 illustrate a simplified system in order to facilitate understanding of the operation of the invention. Thus, in the more detailed description below, additional integrators are included in order that all of the transitions of the input PCM may be distinguished. For example, it will be apparent that in the simplified system of FIG. 6, a transition in the signal 50 at time $T_5$ or $T_7$ will not be recognized since integrator $I_1$ is in hold and is reset during the preceding bit period ($T_5$–$T_7$) and integrator $I_3$ is in hold and reset for the following bit period ($T_7$–$T_9$). As described hereinafter, a total of three integrating means enable the recognition of each and every transition.

PHASE ERROR DETECTION

Another significant feature of the invention is a provision of a reception system for PCM signals which provides an accurate control over the phase and frequency of the local clock generator. This portion of the invention incorporates the preceding described integrators $I_1$ and $I_3$ and in addition another integrator $I_2$ which is used to obtain the integral over an integrating period centered around the transition position. FIG. 8 graphically illustrates the operation of this portion of the invention for several different operating conditions. The first PCM signal 60 is presumed to be in phase with the locally generated quadrature phased clock pulses 61 and 62 ($\phi_1$ and $\phi_2$). Integrators $I_1$ and $I_3$ function in the manner described hereinabove whereas the additional integrator $I_2$ is appropriately gated so as to integrate during the transition, i.e. between the time periods $T_2$–$T_4$. The magnitude of signal $V_e$ represents the average of the integration values determined by integrators $I_1$ and $I_3$ subtracted from the integration value determined by integrator $I_2$. Thus, signal 63 is produced when all of the integrators are in hold between time periods $T_5$–$T_6$. As shown, when the clock is in phase with the input signal, the value $$I_2 - \frac{(I+I_3)}{2}$$

or $V_e$ has a magnitude of zero.

A different result, however, is derived when the input PCM signal either leads or lags the locally generated clock signal by an error magnitude $\alpha$. Thus, the input PCM signal 65 is presumed to lead the clock pulses 66, i.e. phase one ($\phi_1$) of the clock does not coincide with the transitions of the PCM waveform. The resulting integration performed during the respective integrate periods are then as shown in FIG. 8 with a resultant output signal 67 of positive polarity. As described hereinafter, the magnitude of this signal corresponds to the magnitude of $\alpha$ and is used to control the phase and frequency of the locally generated clock and thereby synchronize the clock with the received PCM signal.

Input PCM signal 70 of FIG. 8 illustrates the condition wherein the input PCM signal lags the locally generated clock pulses 71. The resulting integrations are shown which produce the output signal 72 having a negative magnitude. Thus, respectively opposite magnitude negative values are generated when the input PCM signal leads and lags the locally generated clock.

FIG. 8 illustrates the fact that a useful error signal is produced only upon the occurrence of a transition in the input PCM signal. Thus, for the signal 75, the resulting output signal is zero regardless of whether the input PCM signal is in or out of phase with the locally generated clock. It will also be apparent that if the input signals 65 and 70 represented respectively opposite windings, i.e. positive going transitions, the output signals 67 and 72 would have respectively opposite magnitudes. Accordingly, the detailed apparatus described hereinafter selects only those phase error signals which correspond to an occurrence by delaying the phase correction until both the presence and sign of a transition are detected. If the transition is of one polarity, the signal $V_e$ is used directly as a phase correction, if the transition is of the opposite polarity, an inverted value of $V_e$ is employed for applying the phase correction.

An estimate of the phase error may be obtained solely from $I_2$ during a transition. Referring to FIG. 8, it will be apparent that the integration value of $I_2$ will be zero for zero phase error (if there is no direct current offset of the received PCM signal) and a proportionally larger value for a phase error condition. In the preferred embodiment of the invention, the output of the integrator $I_2$ is combined with the half-sum of integrators $I_1$ and $I_3$. This latter value provides a local direct current baseline reference, hence, the phase error measurement is substantially independent of low frequency noise components upon the received PCM signal.

MATHEMATICAL DEMONSTRATION OF PHASE ERROR DETECTION

If the midpoint of the middle integrating period of three successive overlapping integrating periods—$I_1$, $I_2$, $I_3$—lags the 180° point (negative-going transition) of a sine wave ($A \sin x$) by an angle $\alpha$ and the integrating periods are $h\pi$, then the quantity $$I_2 - \frac{(I_1+I_3)}{2}$$

is equal to $$2A \sin \frac{h}{2}\pi \left( \cos \frac{h}{2}\pi - 1 \right) \sin \alpha$$

For small values of $\alpha$, the assumption may be made that $\alpha \approx \sin \alpha$.

Then:

$$\alpha \approx \frac{1}{2AF(h)} \left[ I_2 - \frac{(I_1+I_3)}{2} \right]$$

Where:

$\pi = 180° =$ bit period
$h = f_b/f_v$
$f_b =$ bit frequency
$f_v =$ VCO-driven clock frequency
$F(h) = \sin \frac{h}{2}\pi \left( \cos \frac{h}{2}\pi - 1 \right)$

SIMPLIFIED PHASE ERROR DETECTOR

FIG. 9 illustrates a simplified circuit schematic for performing the integrations shown graphically in FIG. 8. In brief, the integrating circuits $I_1$ and $I_3$ are connected via respective output switches $S_3'$ and $S_9'$, and summing resistors 80, 81 to the input of summing amplifier 83, the output of which is connected to the input of summing amplifier 84. Also connected to the input of summing amplifier 84 is the output of integrating circuit $I_2$ via an output switch $S_6$ and summing resistor 85. Summing resistors 80, 81 and feedback resistor 86 of amplifier 83 are of the appropriate value so as to divide the sum of the integrations of $I_1$ and $I_3$ by two. Since the output of summing amplifier 83 is inverted, this value (representing $I_1+I_3/2$) is appropriately subtracted from the integration value generated by integrator $I_2$. The output of amplifier 84 comprises phase error signal $V_e$.

Switching signals for each of the switches of FIG. 9 are graphically illustrated in FIG. 10.

Each of the integrators are appropriately gated to integrate for one bit period, hold for one and a half bit periods and reset over half a bit period in the manner described hereinabove. Switches $S_1$, $S_4$ and $S_7$ are sequentially actuated to produce three overlapping integration periods. By way of example, the input PCM pulse train 85 is presumed to be a series of PCM ONE bits until time $T_9$. Also, the input PCM signal 85 is initially presumed to lead the local voltage controlled oscillator (VCO). The negative going transition at time $T_9$ produces a phase error signal 91 of positive polarity. In the simplified schematic shown, an insufficient number of integrators are provided for generating a phase control signal responsive to the transitions occurring at times $T_{11}$ and $T_{13}$ since integrators $I_1$ and $I_2$ are then in hold or reset condition. In the more detailed embodiment described hereinafter, phase error signals are also generated in response to these transitions.

The positive going transition at time $T_{15}$ produces the negative error signal 92. As described below, the complete system detects the polarity of the transition and inverts those signals produced during negative transitions. Accordingly, signal 91 is delayed and inverted as shown by the phantom lines before being applied to the control input of the voltage controlled oscillator.

At the transition at time $T_{21}$ the local clock and PCM input signal are shown to be in phase. Accordingly, the resulting phase error signal 93 has a magnitude of zero.

PRELIMINARY OVERALL DESCRIPTION OF THE PCM RECEPTION SYSTEM

An overall block diagram of a PCM reception system constructed in accordance with the present invention is illustrated in FIG. 11. As shown therein, the PCM video signal is connected to the input control device 100. Circuit parameters in the input control are preset according to the nominal bit frequency and expected peak-to-peak variation of the input PCM signal. If, during the operation, the level indicator 116 detects the need to alter these parameters, they are adjusted automatically via control lines 117, 118 thus providing adaptation to changing or unexpected signal parameters.

A plurality of sequentially gated integrators 101 are connected to the output of input control 100. These integrators provide three output signals labeled $I_{2m-1}$, $I_{2m}$, and $I_{2m+1}$ where $I_{2m}$ denotes the integration value over an integrating period centered around the $m$th transition period. These integrators function in the manner described above to provide both phase error and transition occurrence detection. As shown, the detector signals are supplied to respective output lines 102, 103 and 104, all of which are respectively connected to the phase estimator 105 which generates the phase error signal $V_e$. The first and third integration values on lines 103, 104 are subtracted by the difference amplifier located in the transition detector portion of the PCM receiver 106.

The transition detector portion of the system includes difference amplifier 106, threshold generator 107, and transition indicator 108. Difference amplifier corresponds in operation to above described difference amplifier 42 of FIG. 6, and provides a voltage at its output proportional to value $I_{2m-1}-I_{2m+1}$. Threshold generator 107, connected to the output of difference amplifier 106, provides an output $\theta$ proportional to the average peak-to-peak rectified value of $I_{2m-1}-I_{2m+1}$.

Transition indicator 108 is an electronic comparator and compares the output V of the difference amplifier with the output $\theta$ of the threshold generator and supplies an output pulse only when the former exceeds the latter. Three output pulsed signals are provided by transition indicator, namely signal PT for which each pulse indicates a positive going transition, signal NT for which each pulse indicates a negative going transition and signal $\tau$ for which each pulse indicates the occurrence of a transition.

The threshold level $\theta$ provided at the output of threshold generator is monitored by the level indicator 116. If the threshold level exceeds preset upper and lower signal amplitude limits, appropriate control signals are applied on either the low-level conductor 117 or the high-level conductor 118 to initiate a level change within the input control 100.

The read-in control 120 provides an output signal $V_c$ which comprises either the phase error signal $V_e$ or the inverted value thereof for respectively negative and positive occuring transitions. As noted hereinabove, the inversion is necessary for those control signals provided by positive polarity transitions since, for a given phase error $\alpha$, the output of the phase estimator 105 is of respectively opposite polarity for positive and negative going transitions.

The output signal $V_c$ is connected to the VCO drive 121 which generates the appropriate phase and frequency signal for controlling the frequency of the voltage controlled oscillator 129. Signal $V_c$ is also connected to a noise detector 123 and slew (change of frequency) detector 124. The noise detector 123 and slew detector 124 generate long term signals indicative of both noise and slew levels of the input PCM video signal. The signals are connected to the VCO drive circuit 121 to automatically vary the phase and frequency correcting loops within this control circuit.

The frequency output of voltage control oscillator 129 is divided by a divider chain of flip-flops 130 to provide the requisite quadrature phases $\phi_1$, $\phi_2$ and repetition rate of the local clock source.

INPUT DETECTOR, BIT REGENERATOR, AND PHASE ESTIMATOR

A more detailed schematic of the input detector, bit regenerator and phase estimator portions of the invention are shown in FIG. 12.

Input control

Input control 100 includes gain control stage 131 comprising amplifier 132 and variable feedback resistance 133, and an inverting gain control stage 134 comprising amplifier 135, variable feedback resistance 136, and variable coupling resistance 137. A baseline-tracking servo loop 138 connected between the input of stage 131 and the output of inversion stage 134 minimizes erratic direct current offset to avoid saturation of the sequentially gated integrators 101. Inversion stage 134 provides the negative feedback necessary for the servo loop.

The values of the gain adjust resistors 133, 136, 137 are initially preset according to the expected peak-to-peak variation detected by the level indicator 116 (FIG. 11) which automatically adjusts these resistance values by supplying control signals on leads 117, 118. By way of specific example, the leads 117, 118 can control an actuator 139 of respective motor driven rheostats.

The sequentially gated integrators 101 comprise six integrators respectively labeled $I_1$, $I_2$, $I_3$, $I_4$, $I_5$ and $I_6$. Each integrator includes an input switch 140, input resistor 141, operational amplifier 142, capacitor 143, a capacitor shunting switch 144 and one or more output switches, 145, 146. The sequential gate signals for actuating the integrator switches may be provided by any of a plural means known in the art. By way of specific example, this function may be provided by a plural stage ring counter driven by the local clock.

Phase estimator 105 includes a first summing amplifier 150 for forming the average of respective pairs of odd numbered integrators $I_1$, $I_3$, $I_5$ (corresponding to the integrations $I_{2m-1}$ and $I_{2m+1}$) and a second summing amplifier 151 for subtracting this average value from a respective one of the even integrators $I_2$, $I_4$ and $I_6$ (corresponding to the integration $I_{2m}$). The output of amplifier 151 is the phase error correction signal $V_e$.

Transition detector

Each of the odd numbered integrators $I_1$, $I_3$, $I_5$ are also connected to an inverting amplifier 152 whose output is connected to a second summing amplifier 153. Amplifiers 152 and 153 provide a signal upon lead 154 corresponding to the difference between respective pairs of odd numbered integrators $(I_{2m-1} - I_{2m+1})$, this value being used to determine the presence and absence of a transition in the received video PCM signal.

The recognition of transistions and their polarity is provided by transition indicator 108 and threshold generator 107. In brief, transition indicator compares the magnitude of the signal $V_T$ with the magnitude of the threshold level $\theta$. If V is greater than $\theta$, the transition indicator produces an output signal indicative of both the occurrence of a pulse and the polarity thereof.

A particular embodiment of a threshold detection circuit is shown in FIG. 12 and comprises averaging circuit 165 and diodes 166, 167. This circuit is connected to the signal whose magnitude represents the quantity $I_{2-1} - I_{2m+1}$ and will have an output signal substantially equal to the average peak-to-peak rectified value of the input PCM waveform so long as the input PCM waveform has approximately the same number of PCM ONES and ZEROS. This assumption is valid for the great majority of transmitted PCM signal waveforms. Then, the input to averaging circuit 165 is either zero voltage or twice the average peak-to-peak value for substantially equivalent time periods with a resulting average value corresponding to the average peak-to-peak magnitude. The threshold value $\theta$ is thus automatically adjusted for peak-to-peak amplitude changes of the input PCM signal, thereby affording maximum accuracy for transition detection.

The degradation in noise rejection of the apparatus without variation of the threshold level will be apparent if it is assumed that the average PCM peak-to-peak signal level increases and decreases while $\theta$ remains constant. An increase in input signal level raises the value of $V_T$ as compared to $\theta$; as a result, more noise impulses can cause false transitional detections. A decrease of the input signal level decreases the value of $V_T$ as compared to $\theta$; as a result, more noise impulses can cancel the actual occurrence of a transition.

The comparison between the integration difference value $V_T$ and the threshold level $\theta$ is made by respective comparators 161, 162. Each of these comparator circuits are widely used in analog digital converters and operate so as to convert an appropriate analog input signal to a digital output signal. By way of specific example, each of the comparators may comprise a difference amplifier connected to a Schmitt trigger circuit. Either the absolute value of $V_T$ or $\theta$ may be provided for the comparison. In the circuit shown, the value of $V_T$ is inverted by stage 160 to produce the value $-V_T$, the value $-V_T$ being compared with $\theta$ in comparator 161 for providing a pulsed signal (NT) indicative of a negative going transition.

The regenerated PCM waveform is produced at the output 163 of bit regenerator 111 connected to the respective outputs of comparators 161, 162 and the local clock 168. By way of specific example, bit regenerator 111 may comprise a flip-flop and suitable AND gates, the flip-flop being set by a PT pulse in synchronization with the local clock and reset by an NT pulse in synchronization with the local clock.

A pulsed signal $\tau$ is also produced at the output of OR gate 169 indicative of the occurrence of each transitions. As shown, this OR gate is responsively connected to both the PT and NT outputs of the comparators 161, 162.

OPERATION OF BIT REGENERATOR AND PHASE ESTIMATOR

The operation of the bit regenerator and phase estimator portions of the system of FIG. 12 is illustrated in FIG. 13 wherein are graphed the respective integrate, hold and reset modes for each of the six integrators $I_1$, $I_2$, $I_3$, $I_4$, $I_5$, and $I_6$ for an assumed PCM input 190. The switching sequence for each integrator is detailed in FIG. 12. For integrator $I_1$ for example input switch 140 is closed for the time period $T_1-T_3$; output switches 145, 146 are respectively closed for time periods $T_3-T_4$ and $T_5$–$T_6$; and shunting switch 144 is closed for time period $T_6$–$T_1$.

The odd numbered integrators $I_1$, $I_3$ and $I_5$ represent either $I_{2m-1}$ or $I_{2m+1}$, i.e, they perform the integrations preceding and following a transition. For this reason, each of these integrators includes a pair of output switches since they are used to supply integration values for two distinct phase and transition detection operations. For example, as shown in FIG. 13, the integration of $I_3$ is combined with the successive integrations of $I_4$ and $I_5$ during their common hold period $T_1$–$T_2$. Likewise, the integration of $I_3$ is combined with the successive integrations of $I_1$ and $I_2$ during their common hold period $T_5$–$T_6$. In the former sequence, $I_3$ represents $I_{2m-1}$ whereas in the latter sequence $I_3$ represents $I_{2m+1}$.

In the example shown, the input PCM signal 190 is initially assumed to lead the clock by an angle $\alpha$ of 45°. The plural sequential triplet integrals provide the phase error signal $V_e$ and the plural sequential doublet integrals provide the transition indication signal $V_T$. In the read-in control 120 described in detail hereinafter, the signal $V_e$ is delayed in phase until the presence and sign of a transition are detected. The VCO control signal $V_c$ shown in FIG. 13 is then produced, this signal being delayed for one-half bit from $V_e$ and comprising the inversion of $V_e$ for positive going transitions and $V_e$ without polarity modification for negative going transitions.

By way of further explanation, the operating sequence of FIG. 13 begins with the successive integrations of $I_3$, $I_4$ and $I_5$ between $T_3$ and $T_1$. There is no transition of signal 190 during this period so that $V_e$ and $V_T$ remain at zero amplitude between the common hold period $T_1$–$T_2$. During the successive triplet integration ($I_5$, $I_6$ and $I_1$); the transition 191 registers during the integration period of $I_1$. This causes both a negative polarity pulse 192 for $V_e$ and a negative polarity pulse 193 for $V_T$. However, the magnitude of pulse 193 is less than the threshold level $\theta$; accordingly, no transition pulse PT, NT or $\tau$ is generated nor does a corresponding signal appear in the VCO control signal $V_c$. This, of course, is the desired operation since the transition was not registered during the $I_{2m}$ integration but rather the $I_{2m+1}$ integration.

The desired transition and pulse correcting signal response due to transition 191 is provided during the succeeding triplet integration ($I_1$, $I_2$, $I_3$). Transition 191 then registers during the integration period of $I_2$ and produces the positive polarity pulse 194 in $V_e$ and the negative polarity pulse 195 in $V_T$. Pulse 195 is greater in magnitude than the threshold generator $\theta$; thus, a transition pulse $\tau$, 196 and a negative transition pulse NT, 197 are produced. The delayed regenerated PCM signal is reset by NT to provide the level 198 corresponding to portion 200 of the input PCM signal 190. The pulse signal 205 of phase control signal $V_c$ corresponds in magnitude and sign to the pulse signal 194 of the signal $V_e$. It will be noted that pulse 205 has been delayed for one-half bit until the detection of the transition indicating pulse 195.

The next triplet integration ($I_3$, $I_4$, $I_5$) is performed between the time period $T_3$–$T_1$ (second sequence). Transition 206 then registers during the integration period of $I_5$ and produces the positive polarity pulse 207 in $V_e$ and the positive polarity pulse 208 in $V_T$. Pulse 208, being smaller than the threshold value $\theta$, is properly rejected since the transition did not occur during the integral $I_{2m}$. Accordingly, the VCO control signal $V_c$ remains at zero magnitude.

The following triplet integration ($I_5$, $I_6$, $I_1$) performed during the time period $T_5$ to $T_1$ (second sequence) detects the transition 206 during the middle integration ($I_6$) and generates the negative pulse 209 in the phase error signal $V_e$ and a positive polarity pulse 210 having a magnitude greater than $\theta$ in the transition detection signal $V_T$. The positive polarity of pulse 210 causes the Read-In control 120 to invert the polarity of phase error pulse 209 and delay same for one-half bit to produce a transition ($\tau$) pulse 215 and a positive transition (PT) pulse 216. The PT pulse 216 in turn sets the bit regenerator 111 to provide the positive transition 217 in the regenerated PCM signal.

In similar manner, the gated integrators 101 provide succeeding overlapping triplet and doublet integrations for synchronizing the clock with the input PCM signal and for regeneration of the PCM signal.

READ IN CONTROL AND VCO DRIVE

Referring now to FIG. 14, the phase error detection signal $V_e$ is connected to a switch 225 shown schematically as a transistor switch. This switch is controlled by $\phi 2$ of the local clock signal derived from the output of divider chain 130 as shown in FIG. 14. The clock phase closes switch 225 during time periods $T_5$–$T_6$, $T_1$–$T_2$, and $T_3$–$T_4$ respectively.

Delay circuit

The signal $V_e$ gated from switch 225 is delayed for the requisite one-half bit period by hold circuit 226 comprising series resistor 27 and parallel storage capacitor 228 connected to high input impedance amplifier 229.

Gating of $V_e$ in response to transition occurrence

The output of the delay stage 226 is connected to the input of a transistor switch 230 which is driven closed by the transition signal $\tau$ ANDED with $\phi_1$ of the local clock. $\phi_1$ clock pulses are generated during the time periods $T_6$–$T_1$, $T_2$–$T_3$ and $T_4$–$T_5$. The AND function is provided by AND gate 231 whose respective inputs are connected to $\tau$ and $\phi_1$ and its output connected to the set input of flip-flop 232. This flip-flop is reset by $\phi_2$. The output of flip-flop 232 closes switch 230 during its set mode and opens switch 230 during its reset mode. Flip-flop 232 also governs the triggering of counter 235 described hereinafter.

Inverter for phase error detection signal

As described above, it is necessary to invert the phase error detection signal $V_e$ for one or the other of the opposite polarity transitions. Inverter stage 236, transistor switch 237, summing resistors 238, 239, and summing amplifier 240 perform this function. For a phase error signal out of delay network 226, resulting from a negative transition of the input PCM signal, the signal is connected directly from the output of switch 230 to the input of summing amplifier 240. Switch PT is then open and the output of stage 240 constitutes the VCO correcting signal $V_c$. However, when the delayed signal at the output of switch 230 results from a positive transition, switch 237 is closed by pulse PT. Summing resistor 238 is selected to have one-half the value of summing resistor 239 so that the inverted magnitude at the output of resistor 238 is twice that of the voltage at the output of resistor 239. Accordingly, the output of stage 240 constitutes the desired delayed and inverted signal $V_c$ for driving the VCO.

Phase correction channel

Signal $V_c$ is introduced in the input of phase correction channel 250 comprising a variable gain amplifier. The gain of this stage may be preset manually according to the characteristics of the signal to be tracked and is also connected to the output of noise detector 123. This latter circuit, described in detail hereinafter, automatically controls the gain of channel 250 in accordance with changes in noise level of the input PCM signal.

Frequency correction channel

The frequency correction channel 251 of VCO drive 121 includes a digitally controlled voltage divider stage 252 and a variable bandwidth integrator stage 253 which determines the bandwidth thereof, which in turn determines the amplitude of the frequency correcting signal applied to the VCO 129. Thus, the bandwidth of stage 253 is inversely proportional to the time required for the VCO controlled clock to assume the frequency of the frequency of the received PCM signal.

The function of the voltage divider stage 252 is to eliminate the overshoot common to normal phase locked loops after long periods without transitions. For example, if the frequency of the local clock and input PCM signal are close together, there may still be produced a substantial phase error signal, especially if there are a large number of bits between successive transitions. Although a large signal indicative of the phase error is desired to control the phase of the VCO, an equally large control signal is not wanted for the frequency correction channel since the latter correction would cause the VCO to overshoot the correct frequency.

The voltage divider stage 252 comprises a fixed resistance 263 connected between the input of the divider and divider node 264, and weighted resistors 261 connected between node 264 and ground. Digital counter 235 is driven by the local clock following each transition and records the number of bits between each transition to a predetermined maximum value determined by the number of stages within the counter. Following each transition, the counter 235 is reset by flip-flop 232. The outputs 260 of counter 235 selectively actuate switches 268 to connect respective ones of resistors 261 into circuit, the resistance value between node 264 and ground being varied inversely to the number of bits occurring since the last transition. In this manner, the magnitude of the signal applied the input of integrator stage 253 decreases as the time since a transition increases.

The frequency correction channel 251 further comprises a preset level control 265 for presetting the VCO to approximately the frequency of the input PCM signal. The preset level, integrator output and phase correction are summed by summing amplifier stage 266 and applied to the input of the voltage control oscillator 129. Since the integrator 253 only operates upon the error between the desired rate and the preset level, its dynamic range is limited and integrator drive becomes insignificant.

*Slew detector*

The slew detector comprises a signal averaging circuit 270 comprising variable resistor 271 and variable capacitor 272 connected in parallel between the input and output of operational amplifier 273. This provides a long term average of the phase corrections which is a measure of the change of frequency or slew. This signal is connected to the integrator 253 of the frequency correction channel 121 to automatically vary the bandwidth of this stage in accordance with the measured slew. A direct readout of slew is also preferably provided by voltmeter 273 or like monitoring device.

*Noise detector*

A noise detector 123 generates a long term signal reflecting the noise level of the input video PCM signal. This signal is provided by rectifying the slew signal and subtracting it from a long term average of the rectified phase corrections. This operation is provided by diodes 280, 281 and averaging circuit 282, said circuit responding to the phase corrections; and inverting stage 285 and rectifiers 286, 287, said circuit responding to the slew signal. The respective output signals are subtracted in the summing amplifier stage 288 to yield the noise level signal which is fed to the phase correction channel 250 of the VCO drive 121 and to a direct readout voltmeter 289 or like monitoring device.

SUMMARY OF THE INVENTION

The present invention provides a substantially improved PCM reception system which is substantially insensitive to low frequency noise components. These components, such as wow, flutter and drift, are especially acute in those telemetry systems wherein the signals are initially recorded on magnetic tape and subsequently transmitted to the reception apparatus. This greatly improved low frequency noise rejection is provided by sequentially performing overlapping integrations upon the input signal in the manner described to obtain precisely accurate signal indications of phase error (and polarity thereof) and transition occurrence (and polarity thereof).

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a system for receiving a noisy pulse modulated signal and regenerating therefrom an accurately reproduced pulse code modulating signal and synchronized clock signal, means for producing a local clock signal, first, second and third integrator means for integrating said noisy signal over a predetermined period and holding the integration value for a predetermined hold period following said integration, control means operatively connected to said first, second and third integrators so that the integration periods of said first, second and third integrators successively overlap means responsively connected to said first and third integrators for generating a signal indicative of the transitions in said noisy pulse code modulated input signal and, means responsively connected to said first, second and third integrator means for generating a signal corresponding to the phase error between said local clock signal and the noisy pulse code modulated input signal.

2. In a system for receiving a noisy pulse modulated signal and regenerating therefrom an accurately reproduced pulse code modulating signal and synchronized clock signal, means for producing a local clock signal, first, second and third integrator means for integrating said noisy signal over a predetermined period and holding the integration value for a predetermined hold period following said integration, control means operatively connected to said first, second and third integrators so that said integration periods are approximately equal to the bit period of the noisy pulse code modulated input signal with the integration period of said first integrator beginning approximately one-half bit period before the integration period of said second integrator and the integration period of said third integrator beginning one-half bit period after the integration period of said second integrator, means responsively connected to said first and third integrators for generating a signal indicative of the transitions in said noisy pulse code modulated input signal and, means responsively connected to said first, second and third integrator means for generating a signal corresponding to the phase error between the local clock signal and the noisy pulse code modulated input signal.

3. In a system for regenerating an accurately reproduced signal and a synchronized clock signal from a noisy pulse code modulated input signal, a transition detector comprising means for integrating said noisy input signal before and after a transition thereof, and means for taking the difference of the integrals before and after said transition, and means responsive to said transition detector for regenerating said clean pulse code modulated signal.

4. In a system for generating a synchronized clock signal from a noisy pulse code modulated input signal,
phase error detection means including three separate integrators for integrating said noisy signal before, during and subsequent a transition thereof respectively, and
means responsive to said phase error detection means for generating said synchronized clock signal.

5. In a PCM reception apparatus,
means for generating a local clock,
integrating means for detecting transitions of the received PCM waveform and the phase error between said local clock and said received PCM waveform and providing output signals indicative thereof, and
means responsive to said transition occurrence and phase error output signals for generating a signal for controlling the phase and frequency of said local clock, said means selecting only those phase error signals which correspond to a transition occurrence.

6. In a PCM reception apparatus,
a plurality of gated integrators for integrating the received PCM signal for a period approximately one bit period long and holding the integration value for a succeeding interval, and
control means operatively connected to said integrators for gating said integrators in sequence.

7. In the PCM reception apparatus described in claim 6, subtraction means, and
means for selectively connecting said subtraction means to respective integrator pairs during common hold periods thereof, said integrators being those which integrated over adjacent bit periods.

8. In the PCM reception apparatus described in claim 7,
means for generating a threshold signal which varies in accordance with the average peak-to-peak value of the received signal, and
means for comparing the output signal of said subtraction means with said threshold signal and generating a signal indicative of a transition when the magnitude of the former signal exceeds the latter.

9. In the PCM reception apparatus described in claim 7,
means for generating a signal substantially corresponding to the average rectified peak-to-peak value of the received signal comprising
diode rectifier means connected to the output of said subtraction means, and
averaging means connected to the output of said diode rectifier means.

10. In the PCM reception apparatus described in claim 6,
means for generating a local clock, and
means selectively coupled to said gated integrators during hold periods thereof for producing an output signal proportional to the phase error between said local clock signal and said received PCM signal.

11. In the PCM reception apparatus described in claim 10 wherein said means selectively coupled to said gated integrator includes,
means selectively connected to triplet integrators integrating over adjacent bit periods and a mutually overlapping period, said means comprising
summing means selectively connected to the integrators of said triplet integrators which integrate over adjacent bit periods, and
subtraction means for subtracting the output of said summing means from the integration value for said overlapping period.

12. In the PCM reception apparatus described in claim 11,
means for delaying the output of said subtraction means for approximately a one-half bit period.

13. In the PCM reception apparatus described in claim 12,
switching means connected to the output of said delay means,
means operatively closing said switching means in response to each transition occurrence in said received PCM signal.

14. In the PCM reception apparatus described in claim 13,
means responsive to each transition of a given polarity in said input PCM signal for inverting the output of said switching means.

15. In the PCM reception apparatus described in claim 10,
clock driver means responsive to said phase error output signal for controlling the output frequency of said local clock.

16. In the PCM reception apparatus described in claim 15,
said clock driver means includes a means for generating a frequency control signal inversely proportional to the number of bits between transitions in the received PCM signal.

17. In the PCM reception apparatus described in claim 16,
said means for generating a frequency error correction signal includes a counter stage for counting the number of bits since the last transition in the received PCM signal, and
weighted resistors selectively dividing the frequency error correction signal in accordance with the count registered in said counter stage.

18. In the PCM reception apparatus described in claim 15,
said clock driver means including a phase correction channel,
means for generating an output signal according to the noise level of said received PCM signal,
and means for varying the gain of said phase correction channel in response to said noise level signal.

19. In the PCM reception apparatus described in claim 18,
said means for generating an output signal according to the noise level of the received PCM signal comprising
means for generating a first signal corresponding to the long term average of said phase error signal,
means for rectifying said phase error signal,
means for generating a second signal corresponding to the long term average of the rectified phase error signal, and
means for rectifying said first signal and subtracting said rectified value from said second signal.

20. In the PCM reception apparatus described in claim 15,
said clock driver means including a frequency correction channel,
means for generating an output signal according to the slew of said received PCM signal,
and means for varying the bandwidth of said frequency correction channel in response to said slew signal.

21. In the PCM reception apparatus described in claim 20,
said means for generating an output signal according to the slew of said received PCM signal according to the slew of said received PCM signal comprising
means for generating a signal corresponding to the long term average of said phase error signal.

22. In the PCM reception apparatus described in claim 15;
means responsive to said phase error signal for generating a phase control signal;
time-averaging means responsive to phase error signal for generating a frequency control signal;
means for generating a signal corresponding to a predetermined clock frequency; and means for controlling the frequency of said local clock responsive to the sum of said phase control signal, said frequency control signal, and said signal corresponding to said predetermined clock frequency.

23. In a PCM reception system,
means for generating a local clock signal,
means for integrating the received PCM signal over a period one bit long and centered around the expected position of a transition in said signal,
means responsively connected to said integrating means for generating a signal corresponding to the phase error between said local clock signal and the received PCM signal.

24. In the PCM reception system described in claim 23,
means for time averaging said phase error signal for producing a signal indicative of the frequency error between said local clock signal and the received PCM signal.

25. In a PCM reception system,
two integrating means each for integrating the received PCM signal over one period each one bit long and symmetrically located on either side of the expected transition position, and
means responsively connected to said intergrating means for generating a signal indicative of a transition in said received PCM signal.

26. In a PCM reception system,
two integrating means each for integrating the received PCM signal over one period each one bit long and symmetrically located on either side of the expected transition position, and
means responsively connected to said integrating means for generating a signal indicative of the amplitude of said reecived PCM signal.

27. In a PCM reception system,
means for generating a local clock signal,
means for generating a signal corresponding to the phase error between said local clock signal and the received PCM signal, and
means for generating an output signal according to the noise level of the received PCM signal comprising
means for generating a first signal corresponding to the long term average of said phase error signal,
means for rectifying said phase error signal,
means for generating a second signal corresponding to the long term average of the rectified phase error signal, and
means for rectifying said first signal and subtracting said rectified value from said second signal.

28. In a PCM reception system,
means for generating a local clock signal,
means for generating a signal corresponding to the phase error between said local clock signal and the received PCM signal, and
means for generating an output signal according to the slew of said received PCM signal comprising
means for generating a signal corresponding to the long term average of said phase error signal.

29. In a PCM reception apparatus,
means for generating a signal indicative of transitions in said received PCM signal,
means for generating a local clock signal, and
means for generating a frequency error correction for said clock generation means inversely proportional to the number of bit periods since the last previous transition.

30. In a PCM reception apapratus,
means for integrating the received PCM signal over two periods symmetrically located on either side of the expected transition position, and
means responsively connected to said integrating means for generating the half-sum of said two integrations, said value providing a local baseline reference.

31. In a PCM reception apparatus,
two integrating means each for integrating the received PCM signal over a period symmetrically located on either side of the expceted transition position, and
means for summing said two integrations for providing a local baseline reference.

32. In a PCM reception apparatus,
two integrating means each for integrating the received PCM signal over a period symmetrically located on either side of the expected transition position, and
means for substracting said two integrations for providing a transition detection.

References Cited by the Examiner
UNITED STATES PATENTS

| | | | |
|---|---|---|---|
| 3,003,696 | 10/1961 | Tullos et al. | 235—181 |
| 3,086,174 | 4/1963 | Zoerner | 328—165 X |
| 3,137,790 | 6/1964 | Berry | 328—127 X |

ARTHUR GAUSS, *Primary Examiner.*

M. LEE, R. H. EPSTEIN, *Examiners.*